M. C. SCHWEINERT AND H. P. KRAFT.
TIRE VALVE AND THE LIKE.
APPLICATION FILED JAN. 6, 1915. RENEWED AUG. 2, 1921.

1,415,407.

Patented May 9, 1922.

WITNESSES:
René Pruine
Fred White

INVENTORS:
Maximilian Charles Schweinert
and Henry Phillip Kraft,
By Attorneys,
Fraser, Sturk & Myers

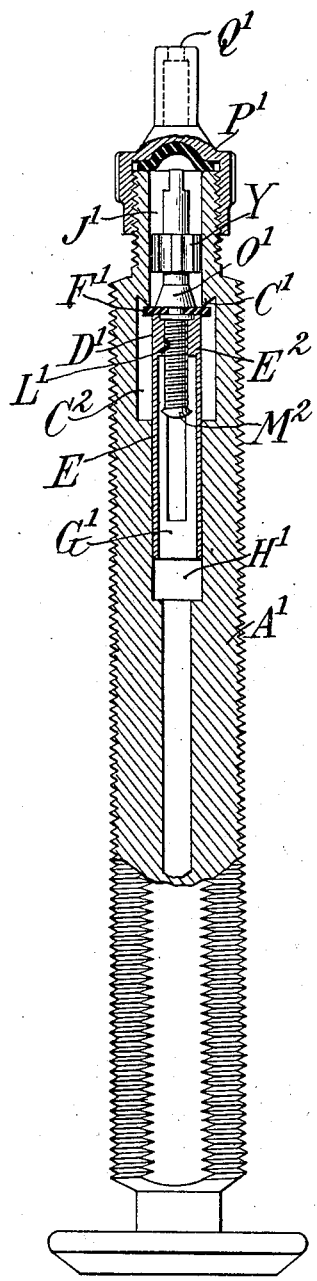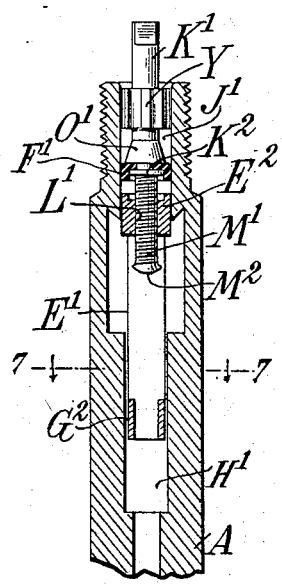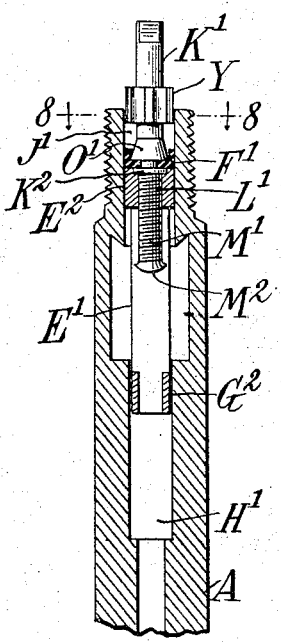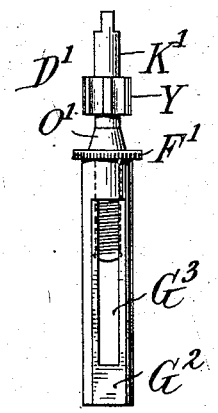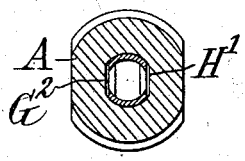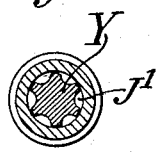

UNITED STATES PATENT OFFICE.

MAXIMILIAN CHARLES SCHWEINERT, OF NEW YORK, N. Y., AND HENRY P. KRAFT, OF RIDGEWOOD, NEW JERSEY.

TIRE VALVE AND THE LIKE.

1,415,407. Specification of Letters Patent. Patented May 9, 1922.

Application filed January 6, 1915, Serial No. 758. Renewed August 2, 1921. Serial No. 489,203.

*To all whom it may concern:*

Be it known that we, MAXIMILIAN CHARLES SCHWEINERT, residing in the borough of Manhattan, city, county, and State of New York, and HENRY P. KRAFT, residing in Ridgewood, in the county of Bergen and State of New Jersey, both citizens of the United States, have jointly invented certain new and useful Improvements in Tire Valves and the like, of which the following is a specification.

This invention relates to tire valves or the like, and aims to provide certain improvements therein.

In valves of this class an elongated shell is usually provided within which is mounted to operate the valve plunger or so-called valve proper. As the valve opens inwardly it is necessary to provide a valve seat within the shell. It has been proposed to make the seat as an integral part of the valve shell, but this has necessitated the introduction of the valve proper through the inner end of the shell, rendering it necessary to remove the valve shell from the tire in order to obtain access to the valve proper for repairs or replacements. This serious disadvantage has led to the employment of a separate valve seat adapted to screw in through the outer end of the shell, a suitable packing being interposed between the seat and the shell to make a tight joint between the two. This construction of so-called top repair valve has been found to work admirably in practice, since it permits the removal of the valve proper from the shell without removing the shell from the tire or tube. Nevertheless the construction has involved certain disadvantages, notably in the multiplication of the parts and the restriction of the air passages through the valve. The object of the present invention is to provide a top repair valve with an integral seat, means being provided for removing the valve proper through the outer end of the shell for repairs or replacement. The invention includes certain other improvements which will be hereinafter pointed out.

In the drawings, which illustrate one form of the invention,—

Figs. 4, 5 and 6 are modified views to Figs. 1, 2 and 3, illustrating the preferred construction;

Fig. 7 is a section on the line 7—7 in Fig. 6;

Fig. 8 is a section on the line 8—8 in Fig. 5;

Fig. 9 is an elevation of the valve proper detached.

Figure 1:
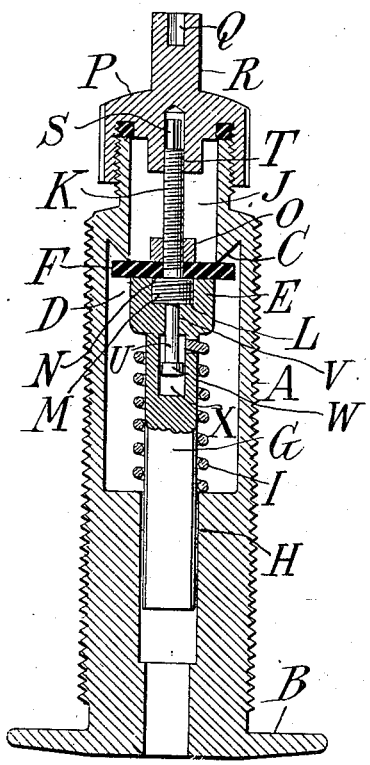
Fig. 1 is a central vertical section of a complete valve.

Referring to the drawings, let A indicate a suitable valve shell, which is preferably provided on its inner end with a flange or shoe B designed to be passed within the tire or tube, the wall of the shell A being screw-threaded to receive clamping nuts adapted to press the tire or tube against the shoe B.

According to the preferred form of the invention the valve is provided with an integral seat C formed in the stock of the shell A, and preferably near the top or outer end of the valve. The valve proper is indicated as a whole by the reference letter D, and is shown as comprising a carrier E adapted to support at its upper end a packing F. The carrier E is preferably provided with a tail G of some non-circular cross-section, the lower end of which is guided by a guide H which is shown as a flange formed integral with the shell A. Between the guide H and the carrier E is preferably interposed a spring I, the function of which is to normally press the carrier E upwardly. The effect of this construction is that while the carrier and its packing may move downwardly with the pressure and upwardly by its spring, it is nevertheless prevented from rotative movement by the tail and guide.

According to the present invention the carrier E is of such dimensions as to pass inwardly through the passage J leading through the top of the valve, and preferably the carrier has the maximum diameter which would enable it to move through the passage. The packing F, however, is of considerably larger diameter than the carrier, so that it must be distorted in order to insert it through the passage J. The packing F is sufficiently flexible for this purpose, as is indicated in Fig. 2, and sufficiently resilient to be capable of assuming substantially its flat condition after it is inserted. Thus when the parts are in the working position shown in Fig. 1, the packing is substantially flat and makes a leak-tight fit with the seat C on its upper face. It is nevertheless supported sufficiently by the carrier E to hold it in place during its normal operation, since the exterior diameter of the carrier E is substantially the same as the interior diameter of the passage J and seat C.

By the construction as thus far described the valve proper may be easily inserted within the shell from the top of the valve, and constitutes an efficient valve proper, it being necessary or desirable only to provide a means for centering the packing upon the carrier, as for instance such a device as the pin K.

But as thus constructed it would be difficult to remove the valve proper after it was once inserted, especially without the aid of a special tool, since a carrier and its connected parts could not be removed unless the packing were previously removed.

Figure 2:
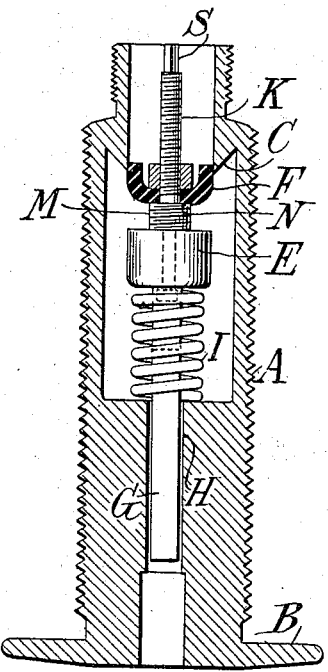
Fig. 2 is a similar section illustrating the method of introducing the valve proper.
Figure 3:
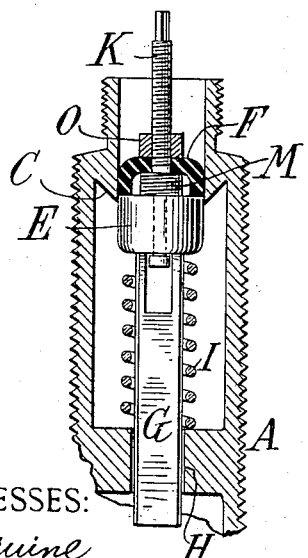
Fig. 3 is a similar section illustrating the method of removing the valve proper.

According to the present invention therefore we provide a means for removing the packing easily and expeditiously, thus permitting the carrier to be easily removed from the shell. This may be accomplished in various ways, but in the construction shown the carrier E is provided with a recess L in its upper face, and this recess is adapted to receive an enlargement M formed on or carried by the pin K. The enlargement M is preferably provided on its upper face with a seat N designed to support the under side of the packing washer, such enlargement being of sufficiently small diameter to afford a space on all sides of it to permit the packing to be flexed or bent downwardly when the pin and packing are passed outwardly through the passage J. The position of the parts during this operation is clearly indicated in Fig. 3. To hold the packing in place at the lower end of the pin, it is preferably clamped on the bearing N by a nut O, the pin being screwthreaded as shown to engage the nut. The nut O materially assists in the operation of inserting the packing, as shown in Fig. 2.

It is preferable that when the parts are in their operative position shown in Fig. 1, the packing shall be held rigidly upon the carrier E, and for this purpose a connection is made between the enlargement M and the carrier, preferably by threading both parts as shown. During the operation of screwing or unscrewing the enlargement M in the recess L the carrier is held against rotative movement by the tail G and guide H, as previously explained.

As a convenient means for screwing and unscrewing the pin, we provide a cap P which is provided with a wrench socket Q preferably formed in an extension R, of less diameter than the cap, and the pin K at its upper end is provided with a corresponding wrench face S. The socket Q and face S are shown as square, but any non-rotative connection may be provided. The cap may also be provided with a socket T on its under side which may have a smooth bore for the purpose merely of receiving the pin and assisting to hold the valve in its proper alignment, or it may be provided with screwthreads adapted to engage the threads of the pin and draw the latter upwardly as the cap is screwed downwardly, thus mechanically holding the valve in its seated position in use. In this case the cap threads should be omitted.

It is desirable that all of the moving parts of the valve proper shall be connected together in order that they may be removed as a whole from the valve by the pin K. To this end the spring I is preferably coupled to the tail G by placing its end through a hole in the latter as shown. We also prefer to provide a swivel coupling between the stem K and carrier E, which may be of any suitable construction, but which is shown as comprising a pin U which passes downwardly through a hole V in the carrier, the end of the pin being enlarged as shown at W and extending into a recess X formed in the tail G. By this construction the pin K is permitted to rotate, while at the same time after the enlargement M is screwed out of the socket L sufficiently to permit the packing F to flex in the manner shown in Fig. 3, all of the movable parts of the valve proper may be removed with the stem K.

The mode of assembling and dis-assembling the parts will be apparent from the foregoing. If the parts are coupled together a complete valve proper is assembled, with the exception that the pin is not screwed to the carrier; and the parts are passed inwardly through the mouth of the shell, as indicated in Fig. 2, the tail passing into the guide H. As soon as the packing washer is below the seat the pin is screwed into the carrier and the parts assume the position of Fig. 1. When it is desired to remove the valve proper, the pin is unscrewed either until the enlargement M is entirely disconnected from the carrier, or until it has risen sufficiently above it to permit the flexure of the packing shown in Fig. 3, whereupon the entire valve proper and connected parts may be easily removed.

Referring to the preferred form of the invention illustrated in Figs. 4 to 9, the valve shell A is formed with an integral valve seat C' below which is an enlarged valve chamber C². Leading to beneath the valve chamber C² is a guide socket H'. The valve proper is indicated as a whole by the reference letter D'. The carrier E' is generally circular in form, and carries the packing F' at its upper end. The tail portion G' of the valve carrier is flattened as shown at G². (Fig. 9); it is also preferably slotted as shown at G³, the slots extending above the bottom of the valve chamber C² as indicated in Figs. 5 and 6. The guide socket H' is also flattened as shown in Fig. 7 to prevent rotation of the valve proper.

The upper part of the carrier designated by the reference letter E² is preferably circular in cross-section and preferably just fits the passage J'. As in Figs. 1–3 the packing F' is larger than its seat, and when the parts are in position of Fig. 4, makes a leak-tight joint with the seat. The carrier is shown as provided with a screw-threaded bore L' adapted to receive the lower end M' of the pin K'. The pin K' is formed with a flange K² upon which the packing washer rests and above the flange is an enlargement O' which bears against the upper surface of the packing washer and serves with the flange to retain the packing washer in position. The pin is also provided with a guide Y above the enlargement O', which guide may be of any suitable shape which will permit air to freely pass around it, and which will properly guide the pin by contact with the wall of the passage J'. One form of such guide is shown in Fig. 8. The pin is squared or flattened at its top, and is adapted to be turned by the socket Q' of the cap P'.

When the parts are in the position of Fig. 4, the packing makes a tight joint with the seat C', being held against the latter by the internal pressure within the tire or other body inflated. When it is desired to remove the valve, the pin K' is unscrewed to the left, the carrier remaining stationary. As soon as the pin is unscrewed sufficiently to raise the packing to about the position shown in Fig. 6, with its edges bent backwardly, the valve proper can be easily removed. The valve proper may be inserted in its unscrewed position in the manner similar to that indicated in Fig. 2, or, as is also true in the construction of Fig. 2, the parts may be screwed up as shown in Fig. 5 and pushed into the valve. In this case no adjustment is necessary after the valve is inserted. When the parts are in the position of Figs. 4 and 5, the collar K² fits in a recess in the top of the valve carrier so that the packing rests upon a flush surface, and thus has an even bearing. Preferably the lower end of the pin K is formed with an enlargement M² so as to limit the movement of the pin whereby the parts are held together as a unitary structure.

While we have shown in detail several embodiments of the invention, it will be understood that we do not wish to be limited thereto, since changes may be made therein without departing from the invention.

We claim as our invention:—

1. A valve for tires or the like, comprising a shell having a valve seat and a check valve inwardly of said seat, said check valve being of larger diameter than said seat when in working position, and said check valve being adapted to assume a condition of lessened diameter sufficient to enable it to pass through said seat, and said check valve comprising a rigid body and a packing material.

2. A valve for tires or the like, comprising a shell having a valve seat and a check valve inwardly of said seat, said check valve being of larger diameter than said seat when in working position, said check valve being removable through said seat, and rigid means for normally preventing said check valve from being forced by pressure outwardly through said seat, said rigid means operable when the valve is in inflating condition.

3. A valve for tires or the like, comprising a shell having a valve seat and a check valve inwardly of said seat, said check valve being of larger diameter than said seat, and comprising a rigid body and a packing material, said packing material being adapted to assume a condition of lessened diameter, whereby to be inserted through said seat, means for preventing the packing from assuming such condition when in normal use, and means for permitting said packing to assume said condition in order to remove said check valve through said seat.

4. A valve for tires or the like, a shell, a seat within said shell, a passage leading through said seat to the outer end of said shell, a valve proper beneath said seat and coacting with the latter, said valve proper comprising a carrier and a packing of a diameter to pass through said seat from the outer end of the shell, and means for operatively connecting said parts after they are within the valve shell.

5. A valve for tires or the like, a shell, a seat within said shell, a passage leading through said seat to the outer end of said shell, a valve proper beneath said seat and coacting with the latter, said valve proper comprising a carrier and a packing; said carrier being of substantially the same diameter as said passage, and said packing being of larger diameter than said passage and fitting against said carrier.

6. In a top repair valve for tires or the like, a shell, a seat within said shell, a passage through said seat to the top of said shell, and a valve proper in said shell, said valve proper comprising a carrier and a packing of a diameter to pass through said seat from the outer end of the shell, and a stem connected to said packing and adapted to be operatively connected with said carrier within said shell.

7. In a top repair valve for tires or the like, a shell, a seat within said shell, a passage through said seat to the top of said shell, and a valve proper in said shell, said valve proper comprising a carrier and a packing of a diameter to pass through said seat from the outer end of the shell, and a pin adapted to make a screwthreaded engagement with said carrier within said shell.

8. A valve for tires or the like, comprising a shell having a fixed seat, a check valve comprising a packing adapted to collapse to pass through said seat and to expand beneath it, and a rigid means for maintaining said packing in normally expanded working condition with reference to said seat.

9. In a valve for tires or the like, a shell, a seat within said shell, a passage leading through said seat to the top of the valve, a carrier of approximately the same diameter as said passage, a packing of larger diameter than said passage, a pin connected to said packing, said pin having a shoulder engaging the packing and a screw-threaded portion and said carrier having a screwthreaded recess, said shoulder being of sufficiently small diameter to permit the passage of said packing through said passage when the packing is flexed around the shoulder.

10. In a valve for tires or the like, a shell, a seat within said shell, a passage leading through said seat to the top of the valve, a carrier of approximately the same diameter as said passage, a packing of larger diameter than said passage, a pin connected to said packing, said pin having a shoulder and a screw-threaded portion, and said carrier having a screw-threaded recess to receive said portion, said shoulder being of sufficiently small diameter to permit the passage of said packing through said passage when the packing is flexed around the shoulder, and means above said packing for holding the latter on said shoulder.

11. In a valve for tires or the like, a shell, a fixed seat member within the shell, a valve proper adapted to cooperate with said seat member and comprising a packing, means for holding the packing, and means for introducing the valve member into the shell past the seat member, and means for adjusting the valve to working condition by a single manipulating part.

12. In a valve for tires or the like, a shell, a fixed seat member within the shell, a valve proper adapted to cooperate with said seat member and comprising a packing, means for holding the packing, means for introducing the valve member into the shell past the seat member, and means for removing the valve member from the shell past the seat member, and a single manipulating part for adjusting the valve to permit such introduction and removal.

13. A valve for tires or the like, having a valve seat in combination with a valve proper having a packing adapted when beneath said seat to enlarge, in effect, and also adapted to contract, in effect, to permit it to pass through said seat, with means for preventing it from contracting when beneath said seat, said means operative by a single member extending toward the mouth of the valve.

14. A valve for tires or the like, having a valve seat in combination with a valve proper having a packing adapted when beneath said seat to enlarge, in effect, and also adapted to contract, in effect, to permit it to pass through said seat, with means for preventing it from contracting when beneath said seat, said means operative by a single member extending toward the mouth of the valve, and said member being adapted to be operated to release said means to permit said packing to contract for the purposes of insertion or removal.

15. In a valve for tires or the like having a flattened hollow carrier, a guide in said valve for preventing rotation of the carrier, a pin having a screwthreaded connection with said carrier, said pin carrying the packing and adjustable to separate from said carrier and to bring it into contact therewith.

16. In a valve for tires or the like having a flattened hollow carrier, a guide in said valve for preventing rotation of the carrier, a pin having a screwthreaded connection with said carrier, said pin carrying the packing and adjustable to separate from said carrier and to bring it into contact therewith, and a guide to said pin above said packing.

17. In a valve for tires or the like having a flattened hollow carrier, a guide in said valve for preventing rotation of the carrier, a pin having a screwthreaded connection with said carrier, said pin carrying the packing and adjustable to separate from said carrier and to bring it into contact therewith, and a guide to said pin above said packing, said guide contacting with the walls of said valve and providing spaces through which air may flow.

18. A valve proper for tire valves or the like, having a lower portion formed with a surface adapted to support a packing, and an upper portion movable with relation thereto, and adapted to be moved to separate said packing from said surface, and to bring it into contact therewith.

19. A valve proper for tire valves or the like, having a lower portion formed with a surface adapted to support a packing, and an upper portion carrying a packing and adapted to be moved with relation to said surface to separate the packing therefrom, and to bring it into contact therewith.

20. A valve proper for tire valves or the like having two portions, one screwthreaded into the other, and a packing positively carried by the upper portion.

21. A valve proper for tire valves or the like comprising two portions, the lower portion being formed with a non-circular part, and the upper portion positively carrying a packing, the upper portion having a screwthreaded connection with the lower portion.

22. A valve proper for tire valves or the like comprising two portions, the lower portion being formed with a non-circular part, and the upper portion positively carrying a packing, the upper portion having a screwthreaded connection with the lower portion, and a guide carried by said upper portion above said packing.

23. A valve for tires or the like, having an integral valve seat in combination with a valve proper having a packing, said packing being adapted to in effect enlarge when beneath said seat, and to in effect contract to pass through said seat, and means for holding said packing in its enlarged condition beneath said seat, said means operated by a relative rotary motion of the parts.

24. A valve for tires or the like, having an integral valve seat in combination with a valve proper having a packing, said packing being adapted to in effect enlarge when beneath said seat, and to in effect contract to pass through said seat, means for holding said packing in its enlarged condition beneath said seat, said means operated by a relative rotary motion of the parts, and said means being adapted to be retracted to permit such contraction of the packing.

25. A valve for tires or the like comprising a shell adapted to receive a screwthreaded connection at the end thereof, an integral valve seat within the shell below the top thereof, a passage leading through said seat to the end of said shell, a check valve collapsible to pass through said seat from the top and expansible to increase its diameter sufficiently to contact with said seat after passing through it and a means preventing said valve from collapsing into the interior of said bore by the internal pressure.

26. A valve for tires or the like comprising a shell adapted to receive a screwthreaded connection at the end thereof, an integral valve seat within the shell below the top thereof, a passage leading through said seat to the end of said shell, a check valve collapsible to pass through said seat from the top and expansible to increase its diameter sufficiently to contact with said seat after passing through it and a means preventing said valve from collapsing into the interior of said bore by the internal pressure, said means being advanced to its operative position by a rotary movement.

In witness whereof, we have hereunto signed our names in the presence of two subscribing witnesses.

MAXIMILIAN CHARLES SCHWEINERT.
HENRY P. KRAFT.

Witnesses:
E. V. MYERS,
FRED WHITE.